United States Patent
Ondrusek et al.

(10) Patent No.: US 7,174,540 B2
(45) Date of Patent: Feb. 6, 2007

(54) COMPONENT DEPENDENCY MATRICES

(75) Inventors: Bohus Ondrusek, Redmond, WA (US); Patrick Joseph Dinio Santos, Renton, WA (US); Kevin Ward Burrows, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 10/462,995

(22) Filed: Jun. 16, 2003

(65) Prior Publication Data
US 2004/0255272 A1 Dec. 16, 2004

(51) Int. Cl.
G06F 9/44 (2006.01)

(52) U.S. Cl. .............. 717/120; 717/121; 717/162

(58) Field of Classification Search ........ 717/120–121, 717/169, 175, 107; 713/1; 709/203
See application file for complete search history.

(56) References Cited

U.S. PATENT DOCUMENTS

| | | | |
|---|---|---|---|
| 6,442,753 B1 * | 8/2002 | Gerard et al. ............... | 717/170 |
| 6,681,391 B1 * | 1/2004 | Marino et al. .............. | 717/175 |
| 6,931,521 B2 * | 8/2005 | Hubert et al. .................. | 713/1 |
| 2002/0147903 A1 * | 10/2002 | Hubert et al. .................. | 713/1 |
| 2002/0161832 A1 * | 10/2002 | Brebner ...................... | 709/203 |
| 2005/0289513 A1 * | 12/2005 | Chen et al. ................. | 717/121 |

OTHER PUBLICATIONS

Esonu et al.; "On the Design of Optimal Fault—Tolerant Systolic Array Architectures"; Department of Electrical and Computer Engineering, Concordia University; IEEE; 1991; pp. 352-357.*
Norman Wilde, "Understanding Program Dependencies", Software Engineering Institute, Aug. 1990; pp. 1-26.
Norman Wilde et al., "Describing Object Oriented Software: What Maintainers Need to Know", Feb. 28, 1992; pp. 1-15.
Tim Jones et al., "DUCAT: A tool for the interactive visualization of program structure", Dec. 7, 1994, pp. 1-22.
Jinhua Li; "Maintenance Support for Untyped Object-Oriented Programs"; University of Stuttgart, Germany, 4 pgs.

* cited by examiner

*Primary Examiner*—Kakali Chaki
*Assistant Examiner*—William H. Wood
(74) *Attorney, Agent, or Firm*—Merchant & Gould P.C.; Ryan T. Grace

(57) ABSTRACT

Described is a system and method for identifying dependency relationships between components in a group of software components. Given a group of software components, a set of direct dependencies between each of the components and any other component is identified. The direct dependencies are indicated in a square matrix where each component in the group of components has a corresponding row and column. A particular component has the same row number as column number in the matrix. Multiplying that the matrix by itself identifies second-order dependencies. Higher order dependencies are identified by repeating the multiplication of the resultant matrix by the first-order dependency matrix. In other words, multiplying the third-order matrix by the first-order matrix achieves the fourth-order matrix, and so on.

25 Claims, 12 Drawing Sheets

501

| | Module 401 | Module 402 | Module 403 | Module 404 | Module 405 | Module 406 | Module 407 | Module 408 | Module 409 |
|---|---|---|---|---|---|---|---|---|---|
| Module 401 | 1 | 1 | 1 | | | 1 | | | |
| Module 402 | | 1 | | 1 | 1 | | | | |
| Module 403 | | | 1 | | | | | | |
| Module 404 | | | | 1 | | | | | |
| Module 405 | | | | | | 1 | 1 | | |
| Module 406 | | | | | | 1 | | | 1 |
| Module 407 | | | | | | 1 | 1 | | |
| Module 408 | | | | | | | | 1 | |
| Module 409 | | | | | | | 1 | 1 | 1 |

FIRST ORDER DEPENDENCIES

| | Module 401 | Module 402 | Module 403 | Module 404 | Module 405 | Module 406 | Module 407 | Module 408 | Module 409 |
|---|---|---|---|---|---|---|---|---|---|
| Module 401 | 1 | 1 | 1 | 1 | 1 | 1 | | | 1 |
| Module 402 | | 1 | | 1 | 1 | 1 | | | |
| Module 403 | | | 1 | | | | | | |
| Module 404 | | | | 1 | | | | | |
| Module 405 | | | | | 1 | 1 | | | 1 |
| Module 406 | | | | | | 1 | 1 | 1 | 1 |
| Module 407 | | | | | 1 | 1 | 1 | | |
| Module 408 | | | | | | | | 1 | |
| Module 409 | | | | | 1 | | 1 | 1 | 1 |

SECOND ORDER DEPENDENCIES

| | Module 401 | Module 402 | Module 403 | Module 404 | Module 405 | Module 406 | Module 407 | Module 408 | Module 409 |
|---|---|---|---|---|---|---|---|---|---|
| Module 401 | 1 | 1 | 1 | 1 | 1 | 1 | 1 | 1 | 1 |
| Module 402 | | 1 | | 1 | 1 | 1 | | | 1 |
| Module 403 | | | 1 | | | | | | |
| Module 404 | | | | 1 | | | | | |
| Module 405 | | | | | 1 | 1 | 1 | 1 | 1 |
| Module 406 | | | | | 1 | 1 | 1 | 1 | 1 |
| Module 407 | | | | | 1 | 1 | 1 | | 1 |
| Module 408 | | | | | | | | 1 | |
| Module 409 | | | | | 1 | 1 | 1 | 1 | 1 |

THIRD ORDER DEPENDENCIES

| | Module 401 | Module 402 | Module 403 | Module 404 | Module 405 | Module 406 | Module 407 | Module 408 | Module 409 |
|---|---|---|---|---|---|---|---|---|---|
| Module 401 | 1 | 1 | 1 | 1 | 1 | 1 | 1 | 1 | 1 |
| Module 402 | | 1 | | 1 | 1 | 1 | 1 | 1 | 1 |
| Module 403 | | | 1 | | | | | | |
| Module 404 | | | | 1 | | | | | |
| Module 405 | | | | | 1 | 1 | 1 | 1 | 1 |
| Module 406 | | | | | 1 | 1 | 1 | 1 | 1 |
| Module 407 | | | | | 1 | 1 | 1 | 1 | 1 |
| Module 408 | | | | | | | | 1 | |
| Module 409 | | | | | 1 | 1 | 1 | 1 | 1 |

FOURTH ORDER DEPENDENCIES

| | Module 401 | Module 402 | Module 403 | Module 404 | Module 405 | Module 406 | Module 407 | Module 408 | Module 409 |
|---|---|---|---|---|---|---|---|---|---|
| Module 401 | 1 | 1 | 1 | 1 | 1 | 1 | 1 | 1 | 1 |
| Module 402 | | 1 | | 1 | 1 | 1 | 1 | 1 | 1 |
| Module 403 | | | 1 | | | | | | |
| Module 404 | | | | 1 | | | | | |
| Module 405 | | | | | 1 | 1 | 1 | 1 | 1 |
| Module 406 | | | | | 1 | 1 | 1 | 1 | 1 |
| Module 407 | | | | | 1 | 1 | 1 | 1 | 1 |
| Module 408 | | | | | | | | 1 | |
| Module 409 | | | | | 1 | 1 | 1 | 1 | 1 |

FIFTH ORDER DEPENDENCIES

*FIG. 9*

REORDERED TO SHOW CIRCULARITY

COMPONENT DEPENDENCY MATRICES

FIELD OF THE INVENTION

The present invention relates to software design. More particularly, the present invention relates to tools for identifying component dependencies.

BACKGROUND OF THE INVENTION

When software programming was in its early stages, a software application was commonly created as one large binary file. In other words, the result of compiling a software application was a single executable file. Software developers quickly learned that this method produced inefficiencies because many different applications included large portions of fundamentally identical code. From that issue evolved dynamic linking. With dynamic linking, a software application is written in two or more pieces. The code in one piece may refer to code in another piece. When the application is compiled, a separate component of binary code is created for each piece of the application. When the application is launched, the pieces are linked together in memory to form the entire application.

Dynamic linking allows common pieces of code to be reused extensively. Code that is routinely used in different applications is brought together into a single library and removed from those applications. Multiple applications may be written that each refer to the same library. A copy of the compiled library is linked in memory to each of the multiple applications only when they are executed. The result is that the code is more easily reused, and is more maintainable. For the purpose of this discussion, each separate body of compiled code is termed a "component" regardless of whether it is a portion of an application, a system service or utility, a library, or any other executable binary. Common examples of executable binaries applicable to the Microsoft Windows operating system are those identified as "EXE,""DLL," and "SYS" type files. In addition, the term "application," as used herein, means a group of components that act in conjunction to achieve some function. In this document, the term "application" includes operating system functions as well as add-on programs.

Although dynamic linking has many advantages, it is not without disadvantages as well. For instance, today software is so complex that it is common to have multiple levels of references. In other words, one component may refer to a second component, the second component may refer to a third component, and so on. As software evolves, some code may be moved from one library to another. Over time, undesirable references can occur, such as circular referencing. Circular referencing refers to the situation where multiple components reference each other in a circular link. For example, one component may refer to a second component, and the second component may refer back to the first component. Circular links often route through multiple components before coming back to the first. If multiple libraries become circularly linked, then for all practical purposes the entire group is effectively a single binary because none of the individual components can safely be used without all the others. This has a negative impact on the modularity of each component. For this reason, discovering when these circular references occurs would be highly advantageous.

In addition, making changes to a linked component must be done with caution. To ensure that a change to one component will not cause problems with any other existing component, the developer must be able to accurately identify the entire list of components that refer to the changed component. For the purpose of this discussion, the terms "dependant" and "dependency" are used to described the relationship between components that refer to other components. A first component that refers to code in a second component is said to "depend" on the second component. The "dependencies" of the second component include the first component.

When analyzing software, it is often necessary to determine the entire list of dependencies for each component associated with an application. This is the only way to determine the entire footprint of the application. When determining how much storage space is necessary to contain an application, the full dependency tree of the application must be determined. The "full dependency tree" means the entire list of components that depend, either directly or indirectly, on a particular component. Determining the full dependency tree of a component or application can be extremely difficult or time consuming using conventional mechanisms.

Accordingly, although mechanisms exist that are capable of finding a full dependency tree, the existing mechanisms are very time-consuming and provide relatively little information compared to the invention.

SUMMARY OF THE INVENTION

The present invention is directed at a system and method for identifying dependency relationships between components in a group of software components. Given a group of software components, a set of direct dependencies between each of the components and any other component is identified. The direct dependencies are indicated in a first square matrix (the "first-order matrix") where each component in the group of components has a corresponding row and column. A particular component has the same row number as column number in the matrix. Multiplying the first-order matrix by itself identifies second-order dependencies. Higher order dependencies are identified by repeating the multiplication of the resultant matrix by the first-order dependency matrix. In other words, multiplying the third-order matrix by the first-order matrix achieves the fourth-order matrix, and so on.

In one aspect, a method involves first identifying direct dependencies between each component in a group of components. A square matrix is created having a row and column that corresponds to each component in the group of components. At the intersection of each row and column, a non-zero value is used to indicate that the component corresponding to the row depends on the component corresponding to the column. Zero values indicate a lack of dependency. By multiplying the matrix by itself, the resultant matrix identifies the first-order (direct) the dependencies and also the second-order (first indirect) dependencies. Higher order dependencies can equally be identified by repeating the multiplication. Actual values of the multiplication need not be identified. Rather, only non-zero values need be determined.

In another aspect, a data structure is provided that includes a matrix having an equal number of rows and columns. Each component in a group of components has a corresponding row and a corresponding column in the matrix. A value at the intersection of each row and column indicates whether a dependency relationship exists between the component corresponding to the row and the component corresponding to the column. The indication is derived by a mathematical operation involving the matrix.

BRIEF DESCRIPTION OF THE DRAWINGS

FIGS. 5–10 are graphical representations component dependency matrixes that illustrate dependencies between the components illustrated in FIGS. 3 and 4 at different dependency orders.

DETAILED DESCRIPTION OF THE PREFERRED EMBODIMENT

The invention provides a mechanism for identifying dependencies among software components through the use of a dependency matrix and matrix mathematics. Briefly stated, the invention involves identifying a first level of dependencies between each of a multiplicity of software components. A dependency matrix is created with each component being identified in each axis of the matrix. Thus, each component has a place in the X-axis of the matrix and a corresponding place in the Y-axis. This matrix is termed the "first order dependency" matrix.

The inventors have determined that each subsequent level of dependencies can then be computed through the application of traditional matrix mathematical principles. For instance, given the first order dependency matrix, the second order dependency matrix can be computed by simply multiplying the first order dependency matrix by itself. Higher order dependencies may be computed by multiplying the immediately prior dependency matrix by the first order matrix. In other words, to get the fourth order dependency matrix, one would multiply the third order matrix by the first order matrix.

Similarly, higher order dependency matrices may be multiplied by themselves to achieve faster convergence. In other terms, let M=$1^{st}$ order dependency matrix. Then:

$M*M=M^2=2^{nd}$ order dependency matrix $M*M*M=M*M^2=M^3=3^{rd}$ order dependency matrix $M*M*M*M=M*M^3=M^4=4^{th}$ order dependency matrix Note—if the previous-order dependency matrix is cached, M4 can be calculated by computing M2 * M2, and so on.

The invention will be described here first with reference to one example of an illustrative computing environment in which embodiments of the invention can be implemented. Next, a detailed example of one specific implementation of the invention will be described. Alternatives implementations may also be included with respect to certain details of the specific implementation. It will be appreciated that embodiments of the invention are not limited to those described here.

Illustrative Computing Environment of the Invention

Figure 1:
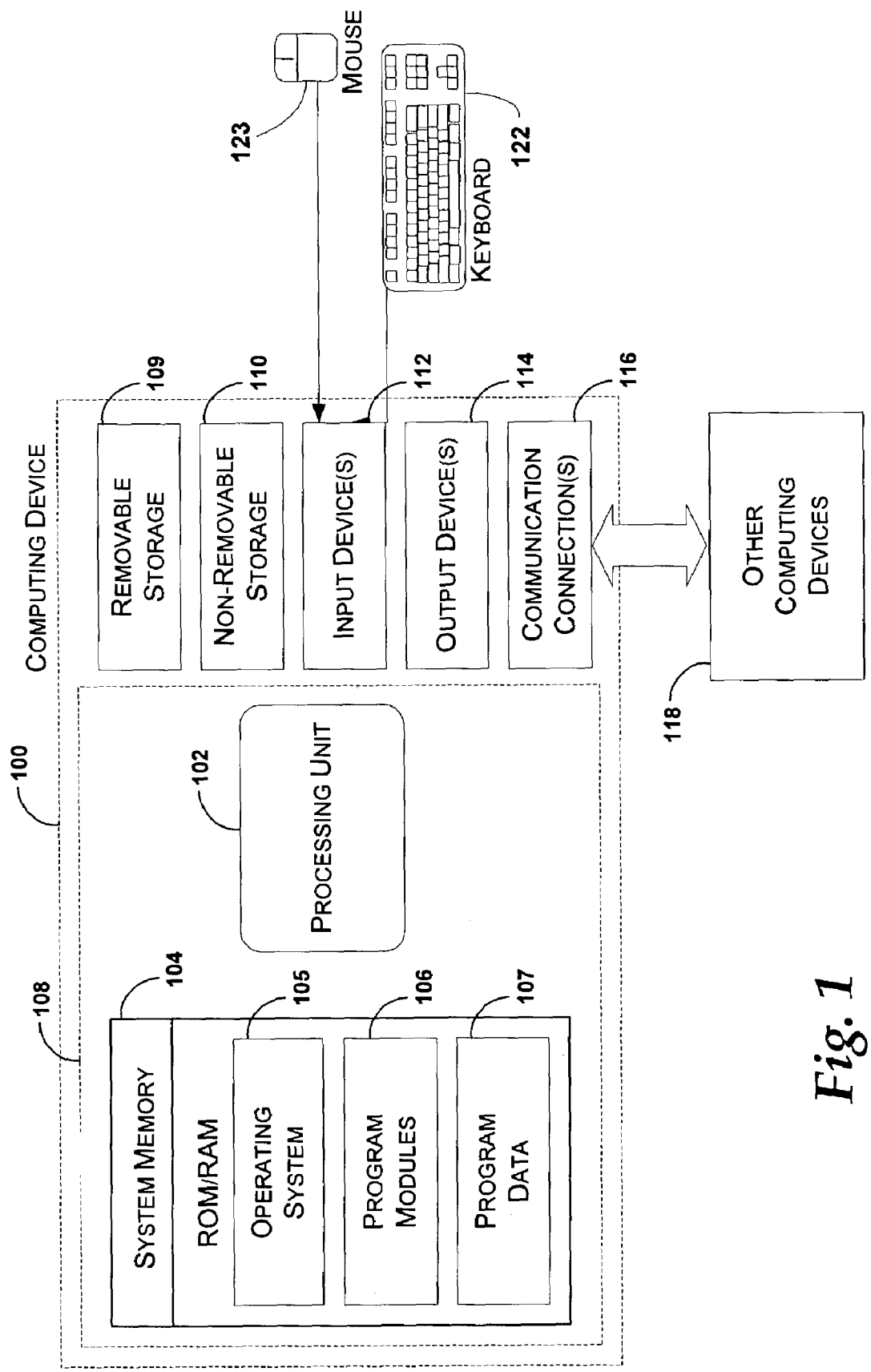
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

General Discussion of Components

Figure 2:
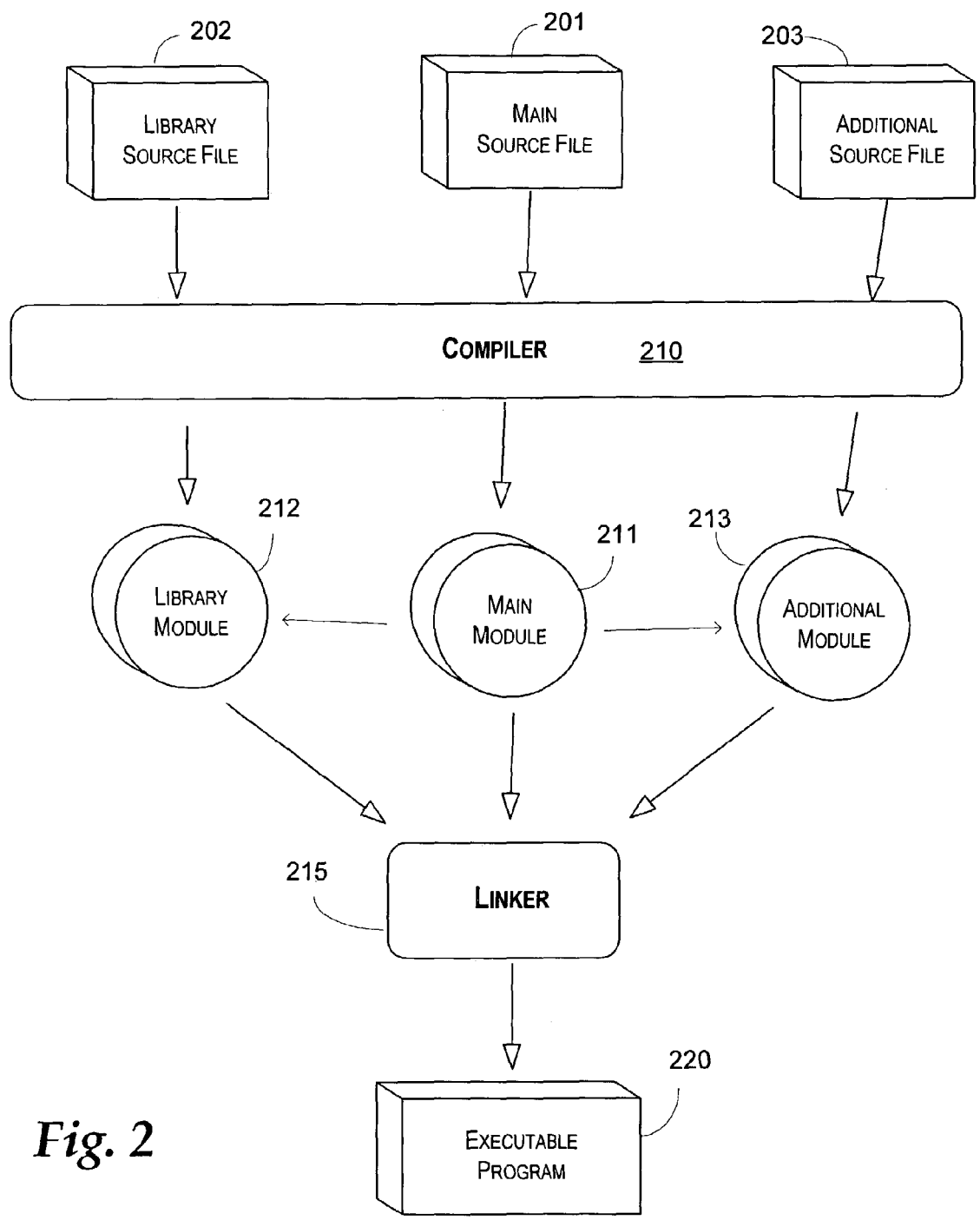
FIG. 2 is a functional block diagram generally illustrating components of a software application in a conventional multi-module software environment.

FIG. 2 is a functional block diagram generally illustrating components of a software application in a conventional multi-module software environment. Illustrated are several source files 201, 202, and 203, each containing source code used in the software application. A main source file 201 may include source code specifically designed to embody the business logic of the application. The main source file 201 typically includes unique code specially written for the application. Generally speaking, the main source file 201 includes code that has applicability only to the specific application for which it was written, although it may also contain code of a more general nature.

A library source file 202 includes source code that embodies more general functionality. The code included in the library source file 202 typically has general applicability for multiple applications resident on the computer. Examples of typical code that may be found in the library source file 202 includes common dialog boxes or printing routines.

An additional source file 203 may also be included that has source code designed with other functionality. The routines in the additional source file 203 may have general applicability, specific applicability, or some combination of the two.

The functionality of the "application" or "program," as those terms are sometimes used, essentially resides in the source code distributed throughout the several source files 201, 202, 203. The main source file 201 may act as a starting point, but various tasks and features of the application may be performed by code described in any one or more of the other source files 202, 203. Code in one source file "calls" code or other resources (e.g., data) in another source file with statements that identify and invoke the code in the other source file. Typically, a reference is made in the first source file to include the code from the other source file, and another statement is made that actually invokes the code. It is these references that create dependencies between two or more components.

A compiler 210 is used to convert the source files 201, 202, 203 from human readable form to machine readable form. In this embodiment, the compiler 210 converts each of the source files 201, 202, 203 from human readable source code to machine readable object code. A new object file is created that corresponds to each source file. Thus, the main source file 201, when compiled, becomes the main module 211, the library source file 202 becomes the library module 212, and the additional source file 203 becomes the additional module 213. At runtime, when the application is launched, a linker 215 combines each of the referenced object files into a single executable program 220 in memory.

Discussion of Embodiments of the Invention

The operation of the invention will now be described though example with reference to FIGS. 3–10, which together illustrate how one embodiment of the invention may be used to identify each level of dependencies between several software components.

Figure 3:
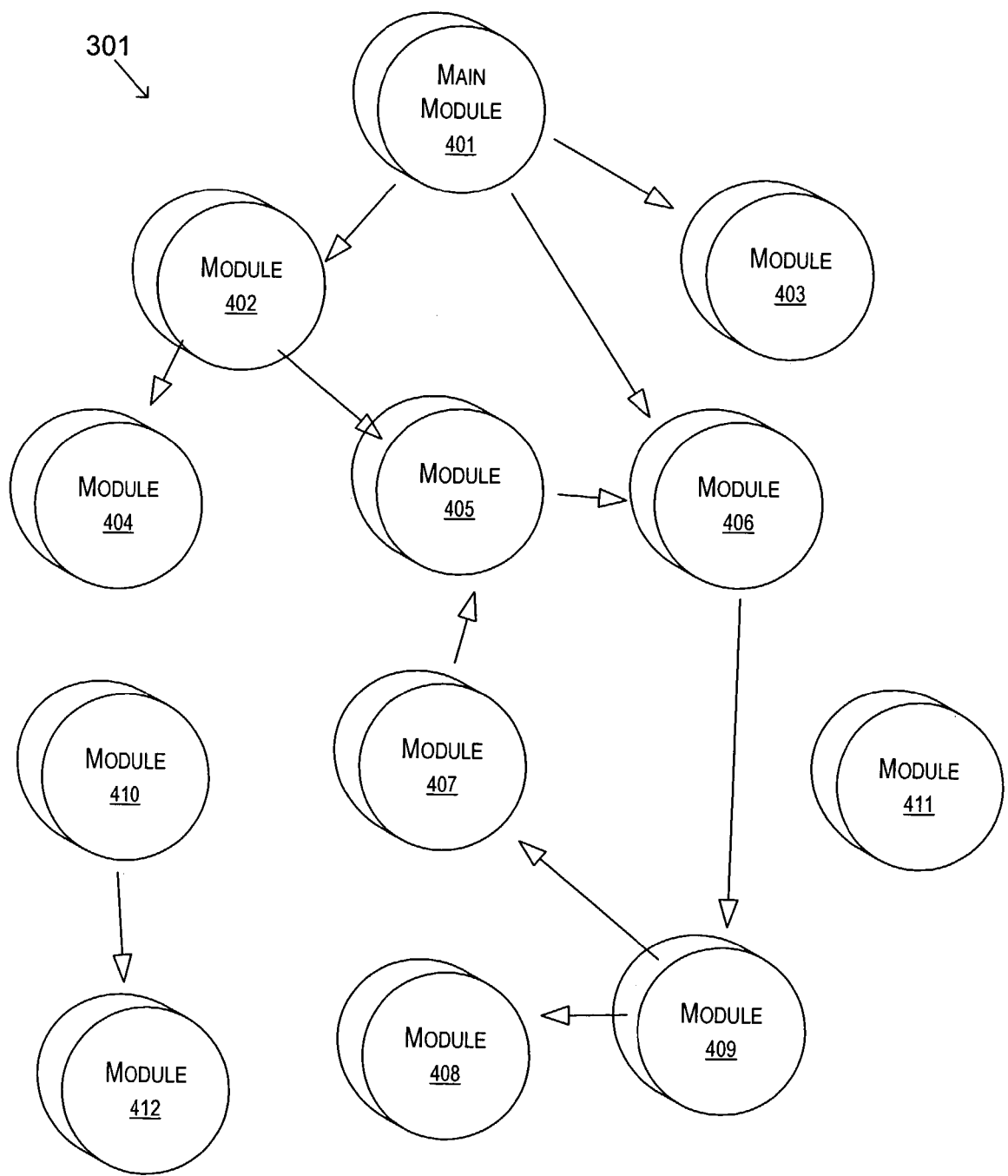
FIGS. 3 and 4 are graphical illustrations of a group of software components that are resident on a computing system or intended to be installed to a computing system.

FIG. 3 is a graphical illustration of a group of software components (e.g., code modules) 301 that are resident on a computing system or intended to be installed to a computing system. The several components include at least one main module 401 that may include an entry point to an application. As is common in software today, the main module 401 includes code that refers to other components for functionality that either supplements or is not included in the main module 401. Each of those other components may in turn refer to still other components. Although only a few components are illustrated in FIG. 3, it will be appreciated that the actual number of components or modules resident on a computing system may easily number in the thousands or tens of thousands. The number of components used in this example is artificially simplified for ease of discussion only.

If one component refers to code in another component, then the one component depends on the other component. The arrows in FIG. 3 represent those dependency relationships. For example, as illustrated, main module 401 depends on module 403, module 407 depends on module 405, and so on. Note that main module 401 depends directly on module 406, and indirectly on module 409 through module 406. In the terminology of this document, main module 401 is said to have a first order dependency on module 406 and a second order dependency on module 409.

Figure 4:
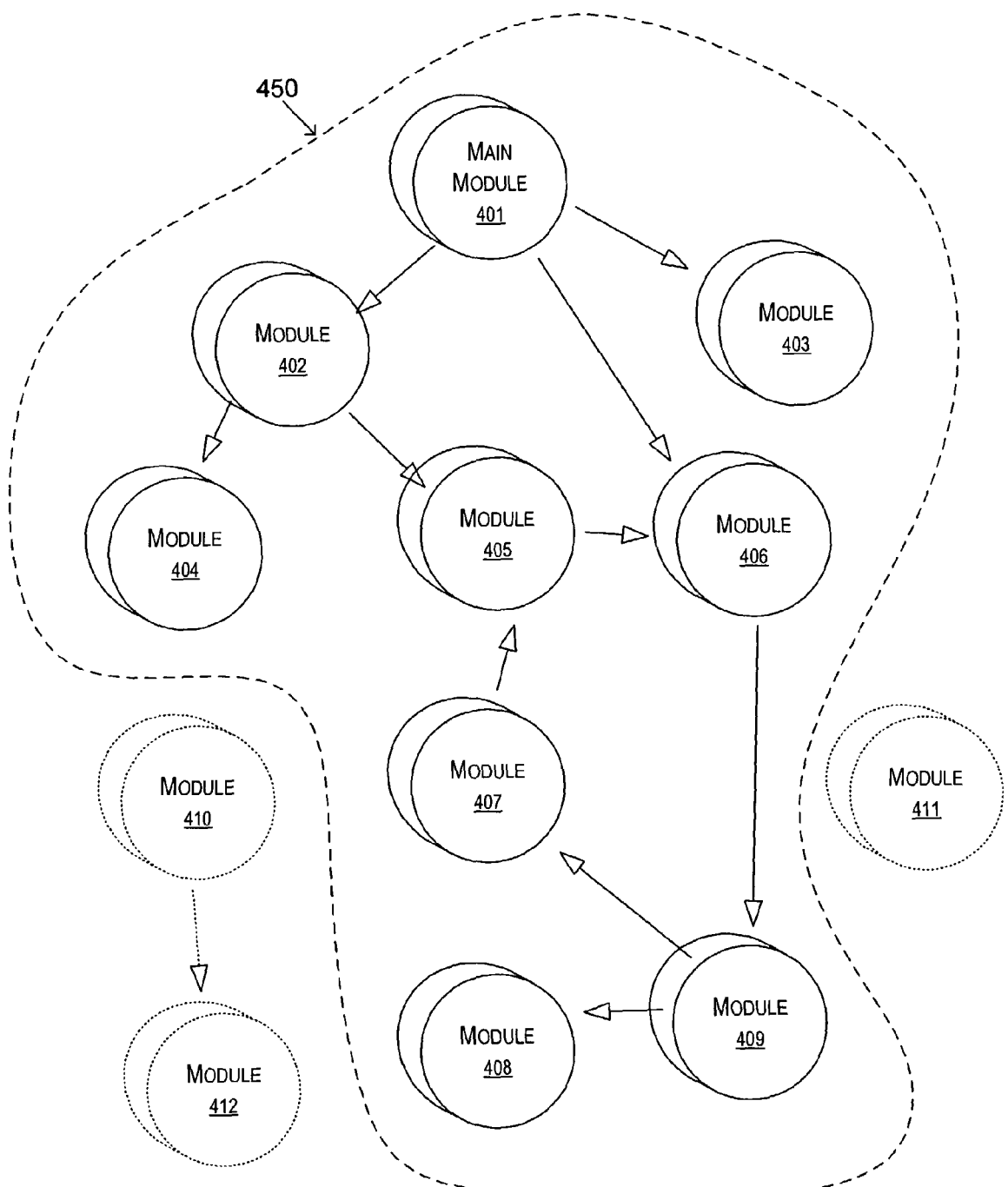

Turning now to FIG. 4, another view of the group of software components 301 is illustrated. In FIG. 4, assume that the main module 401 represents the main component of a given application. A "net code footprint" 450 is shown that represents all the components that must be included with the application to ensure a safe and proper operation of the application. Note that each of modules 401 through 409 depend on each other. Note also that module 410 depends on module 412. However, none of the components in the net code footprint 450 depends on modules 410, 411, or 412. Thus, those components are not included in the net code footprint 450.

Referring now to FIG. 5, a square matrix (first order matrix 501) has been constructed that illustrates first order dependencies between each component in the net code footprint 450. In other words, each component in the footprint 450 has both a corresponding row and column in the first order matrix 501. Each component has the same row and column positions in the matrix. For example, module 405 is in both the fifth row and fifth column, hence the square nature of the matrix 501. Walking across a row, a "1" is included in any column corresponding to a component that the row component depends on. In other words, looking at the first row (corresponding to module 401), a 1 is included in the columns for modules 401, 402, 403, and 406. This indicates that main module 401 depends on each of those components (which includes itself). This can be easily verified by examining FIG. 4. Zeros (indicated in these examples as blank positions) indicate that a dependency does not exist at that order between the components.

To populate the first order matrix 501, the first order dependencies can be determined using any conventional or unconventional method. Static dependencies are established when a component is built and can be easily identified by inspecting the binary file. For example, if A.EXE statically links to B.DLL, then A.EXE is statically dependant on B.DLL. The static dependency is readily identified by inspecting the contents of A.EXE. Delay-load relationships are a special kind of static dependency. They too are easily identified by inspecting the contents of A.EXE. Dynamic dependencies are established at runtime and are more difficult to identify. For example, if A.EXE calls "LoadLibrary ("B.DLL")", then A.EXE has a dynamic dependency on B.DLL. More sophisticated source code analysis or runtime monitors may be used to reveal dynamic dependencies. It is important to note that only first order dependencies (i.e., direct dependencies) need to be discovered. Higher order dependencies will be revealed through the methods of the invention as described below.

It should also be noted that the first order matrix 501 includes only the components in the footprint 450 (e.g. modules 401–409) for simplicity of discussion only. It is obvious that the entire footprint 450 would not be known given only the first order dependencies. In other words, until the full dependency tree of a module is determined, its entire code footprint is not known. Accordingly, in practice a matrix that includes every component or a much larger set of components is more likely. However, including more components in this example would not add to a complete discussion of the invention, so only modules 401–409 are included.

To summarize, the first order matrix 501 has a row and column for each component being analyzed. A "1" at an intersection of a row and column indicates that the component corresponding to the row depends on the component corresponding to the column, or vice versa. Populating the first order matrix 501 can be done using any acceptable technique for discovering direct dependencies.

Turning now to FIG. 6, a second order matrix 601 is illustrated that represents both direct dependencies and dependencies that are indirect through no more than one component. In accordance with the invention, the second order matrix 601 results from essentially multiplying the first order matrix 501 by itself. As is known, matrix multiplication is performed by multiplying each position in a row N of the first matrix by each corresponding position in a column M of a second matrix and summing the values of each multiplication. The resultant value is the value of the position (N,M) of the product matrix.

In accordance with the invention, however any non-zero value in a position represents a dependency. Thus, it is not necessary to determine that actual value that would result at a position, but rather only whether the position is non-zero. For that reason, a 1 is used in these examples to represent any non-zero value. Obviously, the actual value could be used. Using these principles, multiplying the first order matrix 501 by itself yields the second order matrix 601 shown in FIG. 6.

Comparing the second order matrix 601 with the first order matrix 501 reveals that module 401 (row 1) indirectly depends on modules 404, 405, and 409. In addition, module 402 indirectly depends on module 406. These relationships can be easily verified with a quick reference to FIG. 4. Note that, as indicated in the second order matrix 601, module 401 depends on modules 404 and 405 indirectly through module 402, and on module 409 indirectly through module 406. Likewise, module 402 depends on module 406 indirectly through module 405. Other second order dependencies may also be verified.

Turning now to FIG. 7, a third order dependency matrix 701 can be achieved by multiplying the second order matrix 601 by the first order matrix 501. Again, mathematically complete matrix multiplications need not be performed, but rather non-zero positions should be identified. Comparing the third order matrix 701 to the second order matrix 601 reveals that module 401 depends in the third order (i.e., two levels of indirection) on modules 407 and 408. To verify this, refer to FIG. 4 and note that main module 401 depends on modules 407 and 408 through modules 406 and 409. Likewise, other second order dependencies are also revealed by comparing third order matrix 701 with second order matrix 601.

Turning now to FIG. 8, a fourth order dependency matrix 801 is achieved by multiplying the third order matrix 701 by the first order matrix 501. After this exercise, it is shown that module 402 depends in the fourth order on modules 407 and 408. In addition, module 407 depends now on module 408. Again, each of these new dependencies can be verified by referring to FIG. 4.

Turning now to FIG. 9, a fifth order dependency matrix 901 is achieved by multiplying the fourth order matrix 801 by the first order matrix 501. At this point, a comparison of the fifth order matrix 901 to the fourth order matrix 801 reveals that they are identical (i.e., $M^4=M^5$). Accordingly, it is given that the fourth order matrix 801 is the full dependency matrix and all of the dependencies of each component have been identified.

It is important to note here the simplicity with which each higher order dependency is identified. In contrast to conventional methods, higher order dependencies can be computed with relatively simple mathematical principles which are easy to implement in code. The invention overcomes the existing need to create or perform manual investigations of a dependency map or complex database queries. Rather, once it is determined the direct dependencies of each of a group of components, every dependency for the entire group through every level of indirection can be easily computed. This alone represents a major innovation over existing techniques.

Figure 10:
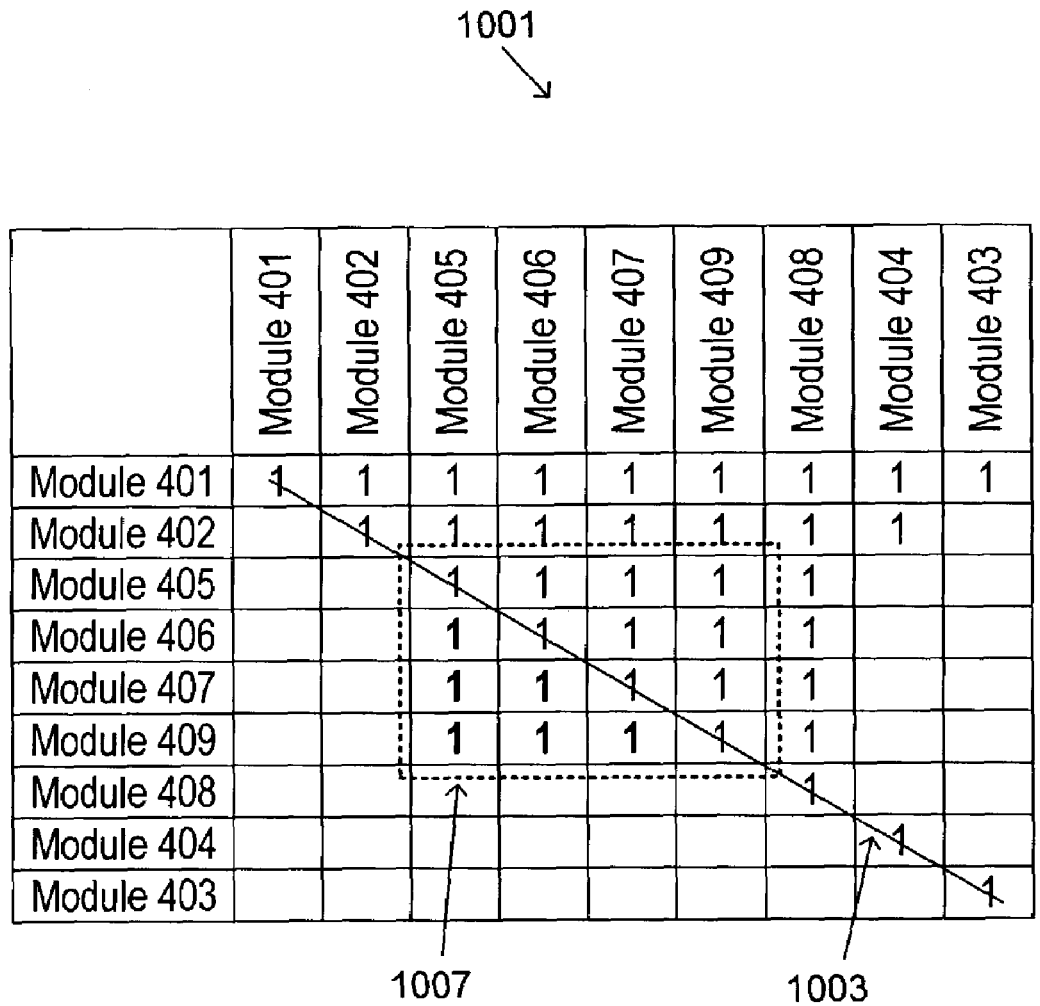

Turning now to FIG. 10, much more information can be derived from the full dependency matrix identified above. For instance, by rearranging the fourth order matrix 801, a "circular dependency matrix" 1001 can be created. Each of the columns and rows of the fourth order matrix 801 can be rearranged in an attempt to move as many zeros (blanks here) below the diagonal 1003 of the matrix. Doing so reveals certain clusters of components that form another square matrix 1007, centered on the diagonal 1003, of non-zero values within the larger circular dependency matrix 1001. The inventors have determined that a non-zero sub-matrix 1007 such as this represents a circular dependency. In other words, by examining the dependencies of the modules in the sub-matrix 1007, it can be determined that every module in the sub-matrix 1007 is inextricably dependent on the group.

Referring briefly to both FIG. 10 and FIG. 4, note that modules 405, 406, 407, and 409 are circularly dependent. Module 405 depends on module 406, which depends on module 409, which depends on module 407, which (completing the circle) depends back on module 405. This circular reference means that the affected components are essentially one large virtual binary. All the components must be present in order for any one of them to function predictably and reliably. This information is easily discerned by a simple visual examination of the full dependency matrix of the present invention. Identifying circular references using conventional techniques is much more difficult and cumbersome.

Moreover, much more information can be discerned from the matrices of the present invention. For instance, a row of the full dependency matrix represents the dependency tree of the component corresponding to that row. If one is interested in finding those components upon which two or more subject components depend, a simple AND operation of the subject component rows can be performed, which yields the desired information. If one is interested in exclusive dependencies between two modules, a simple XOR operation on the rows corresponding to those modules reveals the exclusive components. If one is interested in the components that depend on all of two or more subject components, a simple AND operation can be performed on the matrix elements of the columns corresponding to the subject components.

In addition, the total file size of a particular component's dependency tree can be easily determined. A column vector can be created that includes the sizes of each component in the matrix. Multiplying the full dependency matrix by the size column vector yields the sizes of the binary dependency trees for each component in the matrix.

Figure 11:
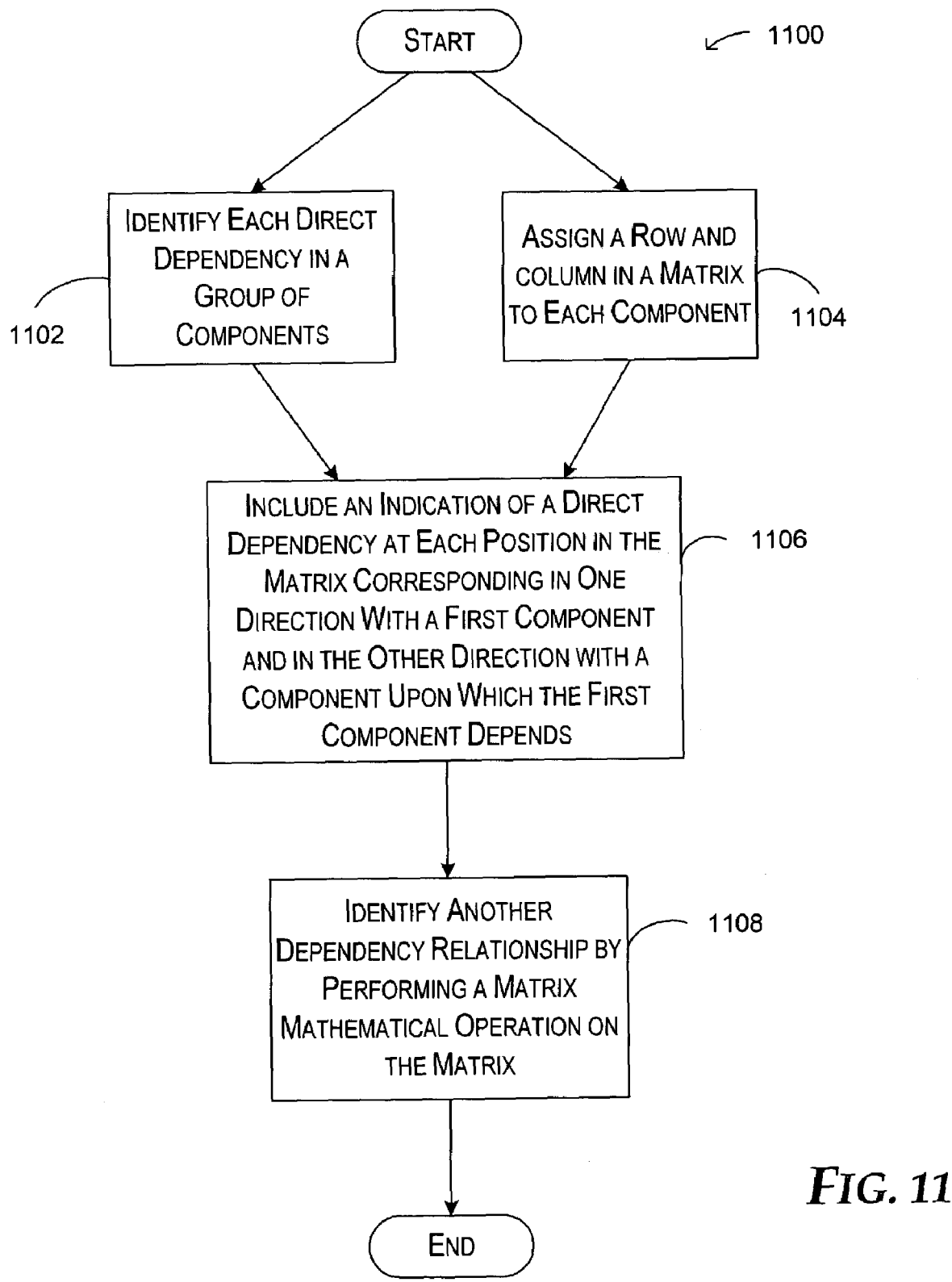
FIG. 11 is a functional block diagram generally illustrating steps of a process for computing dependency information for one or more components of a computing system, in accordance with the invention.

FIG. 11 is a functional block diagram generally illustrating steps of a process for computing dependency information for one or more components of a computing system, in accordance with the invention. The process 1100 begins at stating block 1101 where a group of components is being evaluated to identify the many dependencies between the several components. Two independent tasks occur once the process 1100 begins. One task is represented in block 1102 where the direct dependencies of each component in the group of components is identified. At this block 1102, any conventional mechanism for identifying dependencies may be used. As mentioned above, conventional mechanisms may be used to discover both static and dynamic dependencies.

The other task is represented in block 1104 where a square matrix is constructed that includes a row and column corresponding to each component in the group of components. Preferably, but not necessarily, each component has the same row and column number.

At block 1106, an indication of the direct dependencies discovered at block 1102 is added to the matrix created at block 1104. In this embodiment, a non-zero value (e.g., "1") is used to indicate a dependency relationship at each position where a component corresponding to a row depends on a component corresponding to a column. A zero value is used at the positions where a dependency does not exist. At the conclusion of this operation, the matrix includes information that identifies every first order dependency between each component in the group. Other values may be used without deviating from the spirit of the invention.

At block 1108, another dependency relationship is identified by performing a matrix mathematical operation on the matrix. For example, second order dependencies between the several components may be identified by multiplying the matrix by itself. It should be noted that in the context of this implementation, only zero and non-zero values are important. Therefore, the actual values of the multiplication need not be determined, rather only whether the product is zero or non-zero. As described in greater detail below in conjunction with FIG. 12, multiplying a higher order matrix by the first order matrix reveals the next higher order matrix. This process can be repeated until the full dependency matrix is achieved. It should be noted that many other mathematical operations may also be performed to identify other dependency information, as described above in conjunction with FIG. 10.

Figure 12:
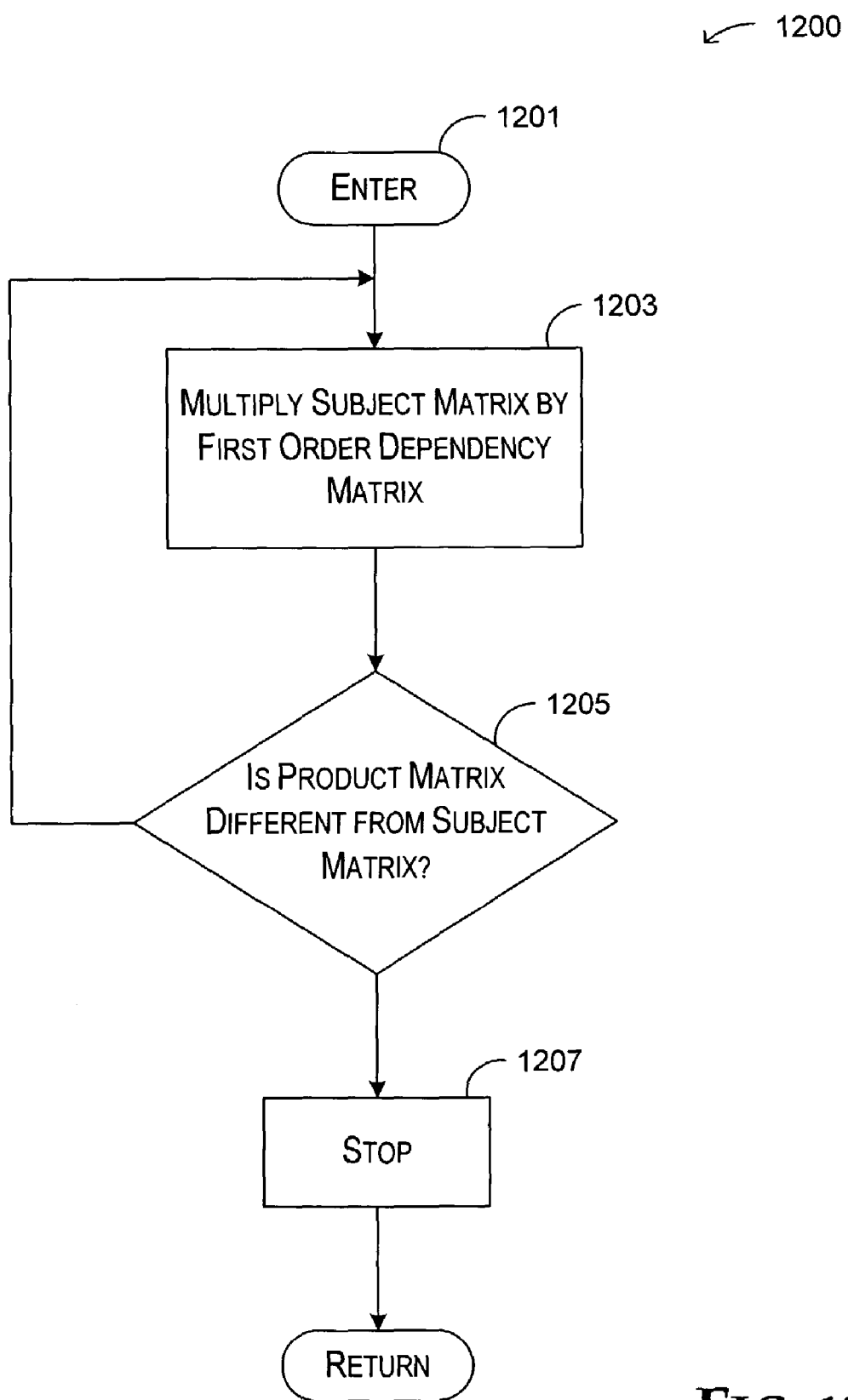
FIG. 12 is a logical flow diagram generally illustrating a process for determining a full dependency matrix, in accordance with one embodiment of the invention.

FIG. 12 is a logical flow diagram generally illustrating a process 1200 for determining a full dependency matrix, in accordance with one embodiment of the invention. The process 1200 begins at starting block 1201, where a first order dependency matrix has been created in accord with the process 1100 of FIG. 11.

At block 1203, the current matrix is multiplied by the first order matrix to achieve a next-higher order matrix. For example, if the current matrix is a second order matrix, then multiplying the second order matrix by the first order matrix yields the third order matrix.

At block 1205, a test is performed to determine if there was a change between the current matrix and the product of the multiplication at block 1203 (the product matrix). In other words, if the product matrix describes an additional dependency that was not present in the current matrix, then it is not yet certain that the full dependency matrix has been identified. Accordingly, the product matrix is made the new current matrix, and the process 1200 returns to block 1203.

Thus, the process iterates through blocks 1203 and 1205 until there are no changes between the current matrix and the product matrix. At that point, the full dependency matrix has been determined, and the process 1200 ends at ending block 1207. It should be noted that convergence on the full dependency matrix is guaranteed since the worst case scenario is that the process will iterate through blocks 1203 and 1205 until a square matrix with all 1's is achieved.

In summary, this detailed discussion in conjunction with the FIGUREs describes embodiments of an invention for more easily describing dependency relationships between components in a software environment. Many uses for implementations of the invention will become apparent to those skilled in the art.

The above specification, examples and data provide a complete description of the concepts and illustrative implementations of the invention. Since many embodiments of the invention can be made without departing from the spirit and scope of the invention, the invention resides in the claims hereinafter appended.

We claim:

1. A computer-implemneted method for identifying dependency relationships between code components associated with an application, the method comprising:
   identifying direct dependencies between the code components assocated with the application;
   creating a matrix in which each code component corresponds to a row and a column of the matrix;
   putting an entry in the matrix at the intersection of code components that have a dependency relationship; and
   performing a mathematical operation on the matix, wherein the mathematical operation generates a second matrix and identifies another dependency relationship between the code components; and
   installing the code components in accordance with the identified relationship.

2. The computer-implemented method of claim 1, wherein the entry in the matrix represents a direct dependency relationship.

3. The computer-implemented method of claim 1, wherein putting the entry in the matrix comprises inserting a non-zero value at a position corresponding to a row and a column if the code component corresponding to the row depends on the code component corresponding to the column.

4. The computer-implemented method of claim 1, wherein putting the entry in the matrix comprises inserting a non-zero value at a position corresponding to a row and a column if the code component corresponding to the column depends on the code component corresponding to the row.

5. The computer-implemented method of claim 1, wherein the mathematical operation comprises a multiplication of the matrix with a second matrix having information about the code components associated with the application.

6. The computer-implemented method of claim 5, wherein the information about the code components comprises additional dependency information.

7. The computer-implemented method of claim 5, wherein the information about the code components comprises size information related to each of the code components.

8. The computer-implemented method of claim 5, wherein the multiplication involves identifying only zero and non-zero values.

9. The computer-implemented method of claim 1, wherein the another dependency relationship comprises an indirect dependency relationship between two or more code components in the group of components.

10. The computer-implemented method of claim 1, wherein the another dependency relationship comprises information about which code component two or more other code components depend upon.

11. The computer-implemented method of claim 1, wherein the another dependency relationship comprises exclusive dependency information.

12. The computer-implemented method of claim 1, wherein the another dependency relationship comprises information about which code components depend on two or more particular code components.

13. A computer-readable storage medium having computer-executable instructions for identifying a dependency relationship between at least two code components associated with an application, the instructions comprising:
   identifying a first matrix having information about a dependency level between code components associated with the application;
   identifying a second matrix having information about another dependency level of the code components associated with the application; and
   performing a mathematical operation using the first matrix and the second matrix to generate a third matrix that includes information about an additional dependency level of the code components associated with the application: and installing the code components in accordance with the information about dependency level of the code components.

14. The computer-readable medium of claim 13, wherein the dependency level in the first matrix includes direct dependencies between code components associated with the application.

15. The computer-readable medium of claim 13, wherein the first matrix is composed of rows and columns, each code component having a corresponding row and column.

16. The computer-readable medium of claim 15, wherein each code component identified in the first matrix has the same row number as column number.

17. The computer-readable medium of claim 13, wherein the information about another dependency level of the code components includes identifying information about indirect dependencies between the code components.

18. The computer-readable medium of claim 17, wherein the identifying information about the indirect dependencies comprises an identification of each second-order dependency between the components.

19. The computer-readable medium of claim 18, wherein the mathematical operation comprises a multiplication of the second matrix by the first matrix to identify third-order dependencies between the code components.

20. The computer-readable medium of claim 13, wherein the mathematical operation comprises a multiplication of the second matrix by the first matrix to identify higher-order dependencies between the code components.

21. The computer-readable medium of claim 20, wherein the multiplication involves identifying zero and nonzero values.

22. A computer-readable storage medium encoded with a data structure, comprising:
   a matrix having a row that corresponds to a first code component of an application, and a column that corresponds to a second code component of the application; and
   an element at the intersection of the row and the column having an indication of a dependency relationship between the first code component and the second code component, the element being derived by a multiplication operation associated with a lower dependency level matrix: and
   installing the first code component and the second code component in accordance with the indicated dependency relationship between the first code component and the second code component.

23. The computer-readable medium of claim 22, wherein the matrix is a square matrix, wherein the first code component and the second code component are members of a group of code components, and wherein each code component in the group of code components has a corresponding row and column in the square matrix.

24. The computer-readable medium of claim 23, wherein each code component in the group of code components has the same row number as column number.

25. The computer-readable medium of claim 22, wherein the element is derived by performing a multiplication operation on the the lower dependency level matrix, the indication being positive if the product of the multiplication operation is non-zero, the indication being negative if the product of the multiplication operation is zero.

* * * * *